(12) United States Patent
Stokely et al.

(10) Patent No.: US 9,945,979 B2
(45) Date of Patent: Apr. 17, 2018

(54) ACOUSTIC SENSOR METADATA DUBBING CHANNEL

(71) Applicant: Halliburton Energy Services, Inc., Houston, TX (US)

(72) Inventors: Christopher Lee Stokely, Houston, TX (US); John L. Maida, Houston, TX (US); David Sharp, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 14/900,819

(22) PCT Filed: Aug. 2, 2013

(86) PCT No.: PCT/US2013/053359
§ 371 (c)(1),
(2) Date: Dec. 22, 2015

(87) PCT Pub. No.: WO2015/016936
PCT Pub. Date: Feb. 5, 2015

(65) Prior Publication Data
US 2016/0154142 A1    Jun. 2, 2016

(51) Int. Cl.
*E21B 47/00* (2012.01)
*G01V 11/00* (2006.01)
(Continued)

(52) U.S. Cl.
CPC .......... *G01V 11/002* (2013.01); *E21B 47/123* (2013.01); *E21B 47/00* (2013.01);
(Continued)

(58) Field of Classification Search
CPC .................................................... E21B 47/082
(Continued)

(56) References Cited

U.S. PATENT DOCUMENTS 3,622,791 A * 11/1971 Bernard ................. H04R 1/005
250/231.19
3,795,801 A * 3/1974 Broussaud ............. G06G 7/195
324/76.33
(Continued)

OTHER PUBLICATIONS

International Search Report on Patentability issued in related PCT Application No. PCT/US2013/053359 dated May 7, 2014 (3 pages).*

(Continued)

*Primary Examiner* — Clayton E Laballe
*Assistant Examiner* — Kevin Butler
(74) *Attorney, Agent, or Firm* — John W. Wustenberg; Baker Botts L.L.P.

(57) ABSTRACT

A system for recording metadata is disclosed. The system includes an acoustic vibration sensing system. The system also includes one or more sensors operable to measure characteristic parameters. The sensors are coupled to the acoustic vibration sensing system and include one or more channels for recording metadata. The system further includes one or more optical modulators. The optical modulators modulate a signal received from the one or more sensors and direct the modulated signal to the acoustic vibration sensing system. The system further includes one or more sources of the metadata coupled to the one or more optical modulators.

20 Claims, 1 Drawing Sheet

(51) Int. Cl.
*E21B 47/12* (2012.01)
*E21B 49/08* (2006.01)
*G01S 15/88* (2006.01)
*E21B 47/08* (2012.01)

(52) U.S. Cl.
CPC .......... *E21B 47/082* (2013.01); *E21B 49/081* (2013.01); *G01S 15/88* (2013.01)

(58) Field of Classification Search
USPC ...................................................... 73/152.58
See application file for complete search history.

(56) References Cited

U.S. PATENT DOCUMENTS

| | | | | |
|---|---|---|---|---|
| 4,281,245 A * | 7/1981 | Brogardh | ............... | G01D 5/268 250/205 |
| 4,442,750 A * | 4/1984 | Bowley | ............... | G10H 1/0033 250/227.19 |
| 4,558,952 A * | 12/1985 | Kulesh | ............... | G01J 9/04 356/486 |
| 4,568,933 A * | 2/1986 | McCracken | ............ | E21B 47/06 340/855.3 |
| 4,699,513 A * | 10/1987 | Brooks | ............... | G02B 6/2843 250/227.19 |
| 4,758,087 A * | 7/1988 | Hicks, Jr. | ............... | G01L 1/243 250/227.18 |
| 5,148,017 A * | 9/1992 | Wolff | ............... | E21B 47/00 250/227.14 |
| 5,394,377 A * | 2/1995 | vonBieren | ............ | G01H 9/004 250/227.14 |
| 5,499,533 A * | 3/1996 | Miller | ............... | G01L 9/0027 338/40 |
| 5,539,375 A * | 7/1996 | Atherton | ............... | E21B 47/12 307/127 |
| 5,625,724 A * | 4/1997 | Frederick | ............... | G01V 1/186 250/227.11 |
| 5,892,860 A * | 4/1999 | Maron | ............... | G01D 5/35383 374/E5.034 |
| 6,167,965 B1 * | 1/2001 | Bearden | ............... | E21B 43/121 166/105.5 |
| 6,268,911 B1 * | 7/2001 | Tubel | ............... | E21B 23/03 250/256 |
| 6,281,489 B1 * | 8/2001 | Tubel | ............... | E21B 47/00 166/250.15 |
| 6,363,780 B1 * | 4/2002 | Rey-Fabret | ............ | E21B 44/00 175/45 |
| 6,404,961 B1 * | 6/2002 | Bonja | ............... | E21B 17/00 385/109 |
| 6,452,667 B1 * | 9/2002 | Fernald | ............... | G01K 5/52 250/227.14 |
| 6,575,033 B1 * | 6/2003 | Knudsen | ............... | G01P 15/093 73/514.16 |
| 8,605,542 B2 * | 12/2013 | Coates | ............... | E21B 47/01 367/25 |
| 8,775,085 B2 * | 7/2014 | Reckmann | .......... | E21B 47/0006 175/24 |
| 9,103,203 B2 * | 8/2015 | Miller | ............... | E21B 47/042 |
| 9,306,700 B2 * | 4/2016 | Zhu | ............... | H04B 10/2537 |
| 9,546,548 B2 * | 1/2017 | Hartog | ............... | E21B 47/101 |
| 2002/0063866 A1 * | 5/2002 | Kersey | ............... | E21B 47/102 356/478 |
| 2002/0109080 A1 * | 8/2002 | Tubel | ............... | E21B 23/03 250/227.14 |
| 2002/0180978 A1 * | 12/2002 | Berg | ............... | G01V 1/184 356/477 |
| 2003/0094281 A1 * | 5/2003 | Tubel | ............... | E21B 47/00 166/250.03 |
| 2004/0141420 A1 * | 7/2004 | Hardage | ............... | E21B 47/00 367/149 |
| 2010/0107754 A1 * | 5/2010 | Hartog | ............... | E21B 47/101 73/152.47 |
| 2010/0207019 A1 * | 8/2010 | Hartog | ............... | E21B 47/101 250/269.1 |
| 2010/0300685 A1 * | 12/2010 | Del Campo | .......... | E21B 17/003 166/254.2 |
| 2013/0167628 A1 * | 7/2013 | Hull | ............... | G01V 1/001 73/152.58 |
| 2015/0021009 A1 * | 1/2015 | Skinner | ............... | E21B 47/00 166/66 |
| 2016/0223710 A1 * | 8/2016 | Barry | ............... | G01V 8/16 |
| 2016/0266265 A1 * | 9/2016 | Kruspe | ............... | G01V 1/186 |
| 2016/0362968 A1 * | 12/2016 | Kriesels | ............... | F16L 58/1036 |
| 2016/0370489 A1 * | 12/2016 | Arsalan | ............... | G01V 3/28 |

OTHER PUBLICATIONS

International Written Opinion issued in related PCT Application No. PCT/US2013/053359 dated May 17, 2014 (7 pages).*
International Search Report and Written Opinion issued in related PCT Application No. PCT/US2013/053359 dated May 7, 2014, 12 pages.
International Preliminary Report on Patentability issued in related PCT Application No. PCT/US2013/053359 dated Feb. 11, 2016 (9 pages).

* cited by examiner

ACOUSTIC SENSOR METADATA DUBBING CHANNEL

CROSS-REFERENCE TO RELATED APPLICATION

The present application is a U.S. National Stage Application of International Application No. PCT/US2013/053359 filed Aug. 2, 2013, which is incorporated herein by reference in its entirety for all purposes.

BACKGROUND

As oil well technology becomes increasingly complex, the importance of collecting and analyzing downhole data is increasing. Well logging instruments are often used to probe subsurface wellbores to determine well and formation characteristics. Sonic tools are an example of well logging tools that may be used to provide information regarding subsurface acoustic properties that can be used to analyze the formation, well completion, or well production.

Downhole fiber optic sensing has greatly expanded sensing capabilities in oil wells. Fiber optics technology is revolutionizing the sensing capability of the downhole environment. Instead of placing a traditional sensor downhole and sending the data to the surface, the fiber optic cable itself may act as a sensor. With appropriate electronics on the surface, traditional fiber optic cables deployed in an oil well are used to measure vibrations as well as other parameters such as temperature and strain. Vibrations, or equivalently acoustics, are particularly relevant for measuring downhole conditions and monitoring downhole activities.

Of particular interest is a distributed fiber optic sensing technology known as "distributed acoustic sensing" or "DAS" which allows for acoustic detection at periodic locations on the fiber. The typical minimum spatial resolution of current distributed sensing technology allows for acoustic measurements at about every meter or so along the fiber. The length of a fiber optic cable deployed in an oil well can typically be several kilometers long. This means that a distributed acoustic sensor can simultaneously measure acoustics at thousands of locations. The ability to make distributed measurements of acoustic signals is nearly unique among all sensing technologies. The information obtained by acoustic measurements has a number of applications, including, but not limited to, monitoring drilling operations, wellbore interventions, wellbore wireline activities, well completions, reservoir properties, seismic correlations, petrophysics, rock mechanics, and other areas.

A distributed acoustic sensor is often recording acoustic data at a higher rate than any other oil field instrument. This available bandwidth can be used to record the data from other sensors or systems. Additionally, there are almost always available distributed acoustic sensor channels that can be utilized.

During drilling operations or well completion activities, human personnel are often responsible for taking notes. However, during downhole activities that occur rapidly, such as fracturing, it is often difficult to properly record an operator's observations or notes (e.g., data log) in real-time during the drilling operations. The notes are generally recorded in handwritten or typed form. It is often difficult for the operator to provide this handwritten or typed data log along with the recorded information for processing and analysis at a later time. Such problems include, but are not limited to, irregular, unreliable, and incomplete operator documentation concerning the drilling operation. It is also difficult to consolidate data from other sensors into a single data stream. Moreover, various problems may arise due to the lack of synchrony for clocks between recording systems.

Figure 1:
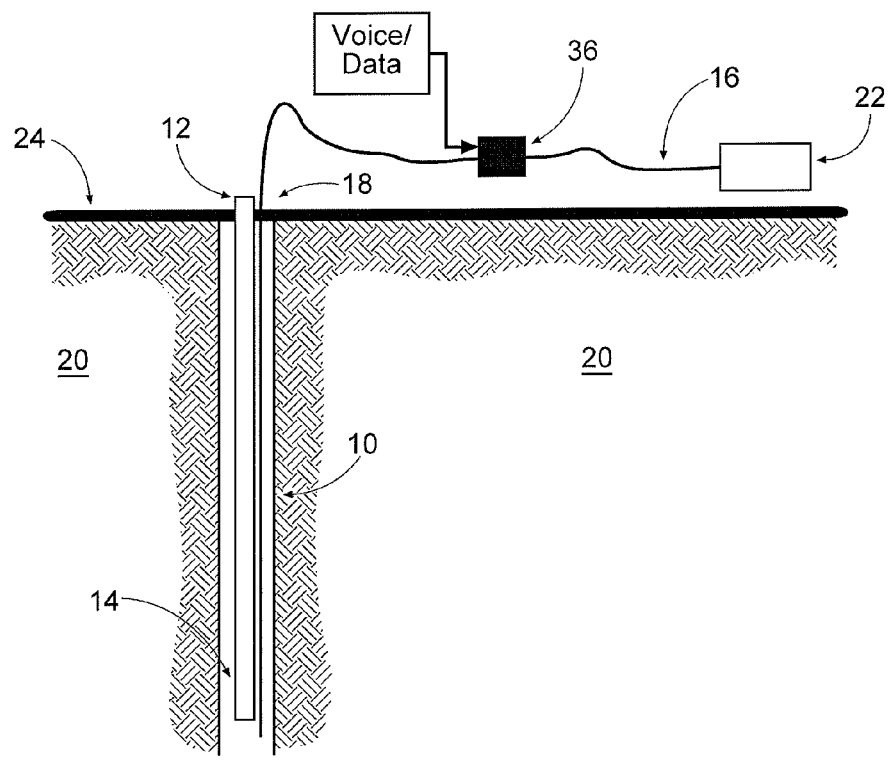
FIG. 1 illustrates a partial cross-sectional view of system in accordance with a first embodiment of the present invention.

While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION OF THE DRAWINGS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells. Embodiments may also be applicable to distributed acoustic systems that monitor other structures such as subsea risers, subsea umbilical cables, marine towed fiber(s), or trenched fiber(s) used in monitoring a pipeline, perimeter security, and/or tracking of migratory animals.

The terms "couple" or "couples" as used herein are intended to mean either an indirect or a direct connection. Thus, if a first device couples to a second device, that connection may be through a direct connection, or through an indirect mechanical, acoustical, or electrical connection via other devices and connections. The term "uphole" as used herein means on the earth's surface above a wellbore or drillstring, and "downhole" as used herein means below the earth's surface in or along a wellbore or drillstring, extending from the surface to the distal end. The term "well toe" as used herein means the distal end of the wellbore or drillstring.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory ("RAM"), one or more processing resources such as a central processing units ("CPUs") or computer processor cores or hardware or software control logic, read-only memory ("ROM"), and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

As would be appreciated by those of ordinary skill in the art, with the benefit of this disclosure, one or more information handling systems may be used to implement the methods disclosed herein. Specifically, the one or more information handling systems may include machine-readable instructions to perform the methods disclosed herein. In certain embodiments, the different information handling systems may be communicatively coupled through a wired or wireless system to facilitate data transmission between the different subsystems. The structure and operation of such wired or wireless communication systems is well known to those of ordinary skill in the art having the benefit of the present disclosure and will therefore, not be discussed in detail herein. Moreover, each information handling system may include storage media and/or memory and may be any computer-readable media that stores data either permanently or temporarily.

For the purposes of this disclosure, storage media and/or memory may include any one or a combination of volatile or nonvolatile local or remote devices suitable for storing information. For example, storage media and/or memory may include a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), a solid state drive ("SSD"), flash memory, magnetic storage devices, optical storage devices, network storage devices, cloud storage devices, or any other suitable information storage device or a combination of these devices.

The present application relates generally to equipment utilized and operations performed in conjunction with subterranean wells and, more particularly, to a system for recording information regarding well operations in real-time, near real-time, or after the operations are performed or completed. It will be understood that the term "oil well drilling equipment" or "oil well drilling system" is not intended to limit the use of the equipment and processes described with those terms to drilling an oil well. The terms also encompass drilling natural gas wells, non-hydrocarbon, or hydrocarbon wells in general. Further, such wells can be used for production, monitoring, or injection in relation to the recovery of hydrocarbons or other materials and energy from the subsurface.

Drilling-related measurements may be performed downhole and information transmitted to the surface while drilling the well. Such measurements are typically referred to as Measurement-While-Drilling ("MWD") operations. MWD is the term for measuring conditions downhole concerning the movement and location of the drilling assembly while the drilling continues. "Logging-while-drilling" is the term for similar techniques that concentrate more on formation parameter measurement. Devices and methods in accordance with certain embodiments may be used in one or more of wireline, MWD and logging-while-drilling (LWD) operations.

Deployment in an oil well can mean one of many things, including, but not limited to, permanent attachment to the outer diameter of casing or tubing, permanent placement in cement, or permanent or temporary placement in the center of the wellbore as a wireline; and/or any combination of the foregoing. Although certain methods of mounting a DAS fiber optic cable are disclosed as suitable for deployment in an oil well, as would be appreciated by those of ordinary skill in the art having the benefit of the present disclosure, any other methods to may be used without departing from the scope of the present disclosure.

The system disclosed herein consists of recording metadata, which are one or more vocal dubbing channels and/or one or more channels for recording information on optical waveguides or fiber optic cables. The optical waveguides or fiber optic cables may be within a distributed acoustic sensing ("DAS") system. Although a DAS system is disclosed as a suitable embodiment for measuring acoustics and recording metadata, as would be appreciated by those of ordinary skill in the art having the benefit of the present disclosure, other optical waveguides or fiber optic embodiments that can measure acoustics and record metadata, such as fiber Bragg gratings, may be used without departing from the scope of the present disclosure.

The term "metadata" as used herein refers to data which provides information about one or more aspects of a data file. Metadata may be analog or digital, and may include, but is not limited to, voice, flow rate data, temperature, pressure, proppant/treatment fluid concentration/types, revolutions-per-minute ("RPM") of motors and/or engines associated with oilfield operations, and blender parameters. The term "channels" within a distributed acoustic sensing system or "DAS" system refers to locations on a fiber optic cable that effectively act as a microphone recording system. The term "location" on the fiber optic cable refers to some distance along the fiber at a particular location relative to some other location such as the end of the fiber, optical interrogator at the surface, etc., that measures the dynamic stretching and/or compression of the fiber. The dynamic fiber stretching and/or compression may be caused by traditional acoustics, seismic sources, or some other mechanical means. One or more of the "channels" on the fiber optic cable may be the equivalent of a fiber optic distributed acoustic sensor.

In one embodiment, the system disclosed herein may be used in conjunction with a wellbore disposed in a subterranean formation. In an embodiment shown in FIG. 1, a wellbore 10 may be created so as to extend into a subterranean formation 20. In one embodiment, a casing 12 may be disposed within the wellbore 10 and cement 14 may be introduced between the casing 12 and the wellbore 10 walls in order to hold the casing 12 in place and prevent the migration of fluids between the casing 12 and the wellbore 10 walls. The system may further include an acoustic vibration sensing system 22. Although the acoustic vibration sensing system 22 is depicted in FIG. 1 as being located above the surface 24, the acoustic vibration sensing system 22 may be positioned as desired for a particular operation.

Thus, any positioning of the acoustic vibration sensing system 22 may be used without departing from the scope of this disclosure.

The acoustic vibration sensing system 22 may comprise an information handling system (not shown) and an optical device (not shown) (such as, an interrogator, a recorder and/or a signal conditioning/analysis/display apparatus, etc.) (not shown). The acoustic vibration is sensing system 22 may be located a suitable distance from the wellhead 18, depending on the operational and safety considerations applicable to the particular subterranean operation. The distance of the acoustic vibration sensing system 22 from the wellhead 18 may also minimize machinery-generated acoustic pickup at the optical device. The system may also include operator personnel (i.e., operator(s)), often located at the interrogator/demultiplexer/demodulator and the information handling system. The operator(s) may be individuals responsible for setting up and operating the downhole acoustic sensor and/or other data gathering equipment, as well as coordinating with other individuals collecting oil field data and controlling oil field operations.

The acoustic vibration sensing system 22 may also include any type of sensor(s) capable of measuring characteristic parameters of vibrations. For instance, in certain implementations, the acoustic vibration sensing system 22 may be coupled to one or more optical waveguides 16. The optical waveguides 16 may be fiber optic cables or fiber ribbon(s). The optical waveguides 16 may be located above ground or underground. The optical waveguides 16 may be placed at any desired location including, but not limited to, in a wellbore, along a wellbore, and/or within a drillstring, for monitoring oil field operations, or used for monitoring a pipeline, perimeter security, or monitoring of traveling personnel or migratory animals.

As would be appreciated by one of ordinary skill in the art, the sensor(s) used in the acoustic vibration sensing system 22 which are capable of measuring characteristic parameters may include one or more of an optical distributed acoustic sensor, an array of fiber optic Bragg grating acoustic sensors, optical distributed vibration sensor, or any other suitable sensor. Suitable optical distributed acoustic and vibration sensors are described in U.S. Patent Application Serial Nos. 2011/0088462 and 2012/0014211. Moreover, a system and method for synchronizing optical signals with the initiation of an event is disclosed in U.S. Patent Application Serial No. 2013/598491, is entitled "Event Synchronization for Optical Signals," is assigned to the assignee of the present application, and is incorporated herein by reference in its entirety. The application discloses the use of a seismic source to generate vibration in the earth and detect reflected vibrations by sensors similar to the sensors of the acoustic vibration sensing system 22 disclosed herein. The structure and operation of seismic sources and reflected vibrations are generally known to those of skill in the art having the benefit of the present disclosure and will therefore not be discussed in detail herein.

In certain embodiments in accordance with the present disclosure, one end of the one or more optical waveguides 16 may be coupled to the optical device of the acoustic vibration sensing system 22. The optical waveguides 16 may extend from the optical device to the wellhead 18 and into the wellbore 10 and/or formation 20, in some cases, may extend over the length of the entire wellbore 10, which may be many kilometers long, and down to the well toe (not shown). In accordance with the present disclosure, measurements taken by the acoustic vibration sensing system 22 may be transmitted as optical signals via the one or more optical waveguides 16. The optical waveguide 16 comprises measurement locations where a location is either a span of fiber for distributed acoustic sensing or one or more point locations using a fiber Bragg grating acoustic sensor. The measurement locations may be distributed along the optical waveguides 16 as desired. For instance, in certain illustrative embodiments, the spacing between the measurement locations along the optical waveguides 16 may be in a range of from approximately one every 1 meter to approximately one every 100 meters. Each measurement location may measure acoustic vibration. This acoustic vibration may be similar to a typical acoustic microphone, which converts sound (i.e., acoustic waves) to an electrical signal.

In certain illustrative embodiments, the optical signals transmitted via the optical waveguide 16 may be modulated by an optical modulator 36. The optical modulator 36 may be located at any location between the optical device of the acoustic vibration sensing system 22 and the well toe (not shown). Although the optical modulator 36 is depicted in FIG. 1 as being located at the surface 24, the optical modulator 36 may be positioned as desired for a particular operation. For example, in certain illustrative implementations, the optical modulator 36 could be positioned in the wellbore 10 or at a location more central to the wellbore 10.

The modulated optical signals generated by the optical signal modulator 36 may then be received by the optical device. These modulated optical signals may be generated using any suitable method of modifying an optical signal transmitted in an optical waveguide. The optical modulator 36 may include a mechanical modulator, an electrostrictive modulator, a magnetostrictive modulator, acoustostrictive modulator, an electro-optic modulator, a magneto-optic modulator, or an acousto-optic modulator. Although certain optical modulators 36 are disclosed herein, as would be appreciated by those of ordinary skill in the art having the benefit of the present disclosure, any other optical modulators may be used without departing from the scope of the present disclosure.

As would be appreciated by one of ordinary skill in the art with the benefit of this disclosure, the optical modulator 36 may modulate the optical signals in any of a variety of different ways. For example, the optical modulator 36 may vary an optical path length via which the optical signals are transmitted, the optical modulators 36 may variably attenuate the optical signals, or the optical modulator 36 may vary a phase of the optical signals. As would be appreciated by one of ordinary skill in the art with the benefit of this disclosure, the optical modulator 36 may amplitude modulate, frequency modulate, or phase modulate the optical signals transmitted through the optical waveguide 16. Any manner of modulating the optical signals may be used, without departing from the scope of this disclosure. Further, a modulation voltage may be used to drive the optical modulator 36. For example, typically for a piezoelectric fiber stretcher, tens of millivolts to a few volts may be sufficient to produce a strain on the optical waveguide 16 for detection by the optical device of the acoustic vibration sensing system 22. The strain produced on the optical waveguide 16 may affect one or more optical signals on the optical waveguide 16.

In one embodiment in accordance with the present disclosure, the optical modulator 36 may be a fiber stretcher. For instance, the optical modulator 36 may include a length of optical fiber mechanically coupled to a piezoelectric material, magnetostrictive material, or any other suitable material for stretching and/or compressing the length of the optical fiber. In certain embodiments, the piezoelectric material may be lead zirconate titanate ("PZT"). In a preferred embodiment, the length of optical fiber mechanically coupled to the PZT may effectively multiply the radial strain transfer from the PZT crystal to the optical fiber. Although certain materials are disclosed for stretching and/or compressing a length of optical fiber, as would be appreciated by those of ordinary skill in the art having the benefit of the present disclosure, any other materials and methods of stretching and/or compressing an optical fiber may be used without departing from the scope of the present disclosure.

In certain embodiments utilizing a PZT, an electrical field applied to the PZT will cause the material to change shape, thereby stretching/elongating or compressing/contracting the optical waveguide 16 or fiber optic cable. This will change the optical path length of the optical waveguide 16, thereby changing a characteristic of the optical signals transmitted via the optical path. The changed characteristic may be, for example, the phase difference of an optical signal output of an interferometer. Other characteristics that may be changed as a result of a change in the optical path length of the optical waveguide 16 may include, but are not limited to, the change in the single mode path length due to the stretching/elongating or compressing/contracting of the optical waveguide 16; the multimode change due to the percentage of light in cladding modes versus core modes; the position of a reflector due to a voltage-driven element; the change in angle of a reflector changing the amplitude of a reflected light signal; the change in the frequency of light as reflected through a movable crystal along different path lengths; the change in the interference patterns on mixed light based upon change of a parameter of one or both of those light sources; the changes in the ratios of a broad spectrum of light or to sub-elements of that spectrum as intermixed with other forms of energy, motion, angular change, amplitude, and phase; and correlated phase changes on the spectra such as in wavelength division multiplexing in phase, amplitude, intermodulate, various core/cladding modes. Any other characteristics may be changed by the modulation without departing from the scope of the present disclosure.

In accordance with the present disclosure, the optical modulator 36 may also be used for recording speech directly onto one or several optical waveguides 16. In certain implementations, the acoustic vibration sensing system 22 may include a recording system for recording data directly onto an acoustic data stream in the DAS system. The term "acoustic data stream" as used herein refers to the collective recorded metadata resulting from the stretching and/or compression of the optical fiber(s). More specifically, the acoustic vibration sensing system 22 may include a microphone pickup (not shown). The microphone pickup may be coupled to the optical modulator 36 and may be used to drive the optical modulator 36. In this embodiment, the microphone pickup acts as an acoustic sensor and is capable of recording metadata in the same manner as described above with respect to the optical waveguide 16. In other embodiments, the operator(s)' speech may be recorded utilizing an all opto-mechanical modulator. For example, in one embodiment, an assembly including an acoustic diaphragm disc and a passively amplified horn assembly, both known to one of ordinary skill in the art, may include a length of optical fiber mechanically coupled to the assembly. This may cause stretching and/or compression of the optical fiber, thus acting as a microphone for recording metadata. Accordingly, utilizing the optical modulator embodiments discussed herein, one or more operators may independently verbally note important information and well operation developments in real-time or after the operation is completed.

As would be appreciated by one of ordinary skill in the art with the benefit of this disclosure, all sounds imparted by the optical modulator 36 to the optical waveguide 16 may be recorded onto the optical waveguide 16. However, the operator(s) may have the option of choosing which "channel" or "channels" on the optical waveguide 16 are recorded. Further, metadata signals may be multiplexed and may be imparted onto a single or multiple DAS system "channels." The acoustic vibration sensing system 22 may include a means of regulating the metadata recorded on the channels. Specifically, the microphone pickup may include a means for being turned on and off, thus allowing the operator(s) to control the ability to record his or her voice, and to control which "channel" or "channels" on the optical waveguide 16 are recorded. Turning the microphone pickup on and off may exclude certain sounds from being recorded. The means of turning the microphone pickup on and off may include, but are not limited to, an on-off microphone-key and a microphone switch. In addition, the means of regulating the metadata recorded on the channels may further include, but is not limited to, a manually controlled analog switch, an analog controlled analog switch, a digitally controlled analog switch, a manually activated digital switch, an analog controlled digital switch, a digitally controlled digital switch, a digital multiplexer control, an analog multiplexer control, a soundproof door in a sound reducing area, a signal operable to turn a noise masking signal on and off, and mixing one or more signals with the optical signal to mask the optical signal transmitted to the optical waveguide.

In certain embodiments, the means of regulating the metadata recorded on the channels may also include a means of encryption in the acoustic vibration sensing system 22. The means of encryption may be used to encrypt the operator(s) voice recordings, thus allowing the operator(s) to preserve and protect confidential information being recorded onto the channels. The means of encryption may include, but are not limited to, adding noise around the metadata being recorded and then removing the noise to retrieve the metadata, sending a signal through an audio or digital preprocessor and mixing the signal with encrypting patterns, and strategically hiding a signal on a baseband multiplexer channel. Moreover, the operator(s) speech may be digitized and electronically translated through any suitable encryption process known to those of ordinary skill in the art. For example, the metadata in the recordings may include permissions for recording approvals or rejections of the operator(s). In this manner, individuals without proper authorization to decode the encrypted recordings may be prevented from accessing the information.

Figure 2:
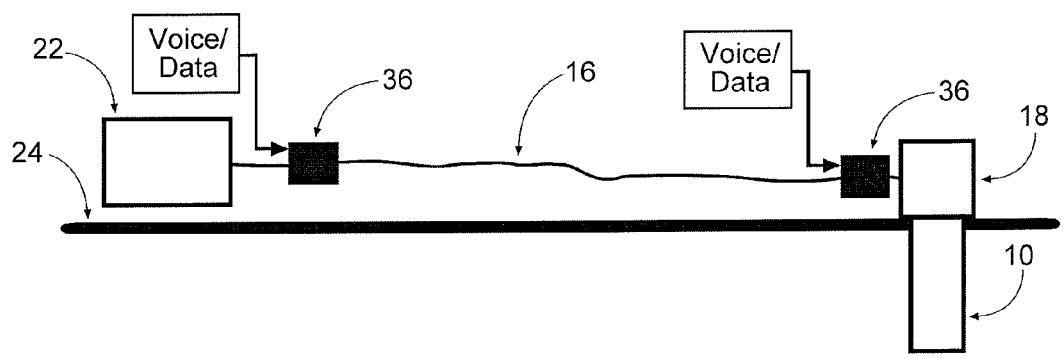
FIG. 2 illustrates a partial cross-sectional view of system in accordance with a second embodiment of the present invention.

FIG. 2 illustrates a second method by which the optical signals may be imparted onto the optical waveguide 16, with the use of multiple optical modulators 36. In a second embodiment shown in FIG. 2, the optical signals transmitted via the optical waveguide 16 may be modulated by one or more optical phase modulators 36. As in FIG. 1, the one or more optical phase modulators 36 may be located between the optical device and the well toe (not shown). Although the optical modulator(s) 36 are depicted in FIG. 2 as being located at the surface 24, they may be positioned at any desired location for a particular operation. For example, if one or more wellbore(s) are present (as shown in FIG. 2), the optical modulator(s) 36 could be positioned in the wellbore(s) or at a location more central to the wellbore(s). The modulated optical signals may then be received by the optical device. The optical modulators 36 may modulate the optical signals in the same variety of different ways, as described with reference to the embodiment illustrated in FIG. 1.

As with the embodiment illustrated in FIG. 1, the one or more optical modulators 36 may be one or more fiber stretchers. In one example, each optical modulator 36 could comprise a length of optical fiber mechanically coupled to a piezoelectric material (such as a PZT), magnetostrictive material, or any other suitable material for stretching the length of optical fiber. Although certain materials are disclosed for stretching a length of optical fiber, as would be appreciated by those of ordinary skill in the art having the benefit of the present disclosure, any other materials and methods of stretching an optical fiber may be used without departing from the scope of the present disclosure. The use of multiple PZTs may allow acoustics with fast and slow rise times to be simultaneously recorded on different channels for later analysis.

In certain embodiments utilizing a piezoelectric material, an electrical field applied to the piezoelectric material may cause the material to change shape, thereby stretching/elongating or compressing/contracting the optical waveguide 16 or fiber optic cable. This will change the optical path length of the optical waveguide 16, thereby changing a characteristic of the optical signals transmitted via the optical path. The changed characteristic may be, for example, the phase difference of an optical signal output of an interferometer. As described with respect to FIG. 1 above, other characteristics may be changed by the modulation without departing from the scope of the present disclosure.

The one or more optical modulators 36 or fiber stretchers may also be used for recording speech directly onto one or several optical waveguides 16. More specifically, a microphone pickup (not shown) may be coupled to the optical modulators 36 or fiber stretchers and may be used to drive the one or more optical modulators 36 or fiber stretchers. The acoustic vibration sensing system 22 may also include a means of regulating the metadata recorded on the channels. Specifically, the means of regulating the metadata recorded on the channels may include a means of turning the microphone pickup on and off, as described with reference to the embodiment illustrated in FIG. 1. The means of regulating the metadata recorded on the channels may further include, but is not limited to, a manually controlled analog switch, an analog controlled analog switch, a digitally controlled analog switch, a manually activated digital switch, an analog controlled digital switch, a digitally controlled digital switch, a digital multiplexer control, an analog multiplexer control, a soundproof door in a sound reducing area, a signal operable to turn a noise masking signal on and off, and mixing one or more signals with the optical signal to mask the optical signal transmitted to the optical waveguide. In addition, the means of regulating the metadata recorded on the channels may include a means of encrypting the operator(s)' voice recordings, as described with reference to the embodiment illustrated in FIG. 1. In the embodiment illustrated in FIG. 2, the use of multiple optical modulators 36 or fiber stretchers allows for multiple voice recordings and/or other analog or digital data to be recorded.

In certain embodiments in accordance with the present disclosure, the optical waveguide 16 may act as an acoustic vibration or seismic vibration sensor. For example, in the cases of distributed temperature, acoustic, vibration and strain sensing, the optical waveguide 16 is itself the sensor, in that temperatures, vibrations, strains, and/or densities, etc. of the optical waveguide are detected as indications of parameters of interest. Various types of optical backscatter in the waveguide 16 (e.g., Raman, Rayleigh (coherent or not), Brillouin (stimulated or not), etc.) may be detected, recorded and analyzed as indications of temperature, acoustic vibration, strain, etc. distributed along the waveguide. Such techniques are well known to those skilled in the art (e.g., as disclosed in the publications mentioned above, etc.), and will therefore, not be discussed in detail herein. Any techniques in which an optical waveguide comprises a sensor may be used, without departing from the scope of this disclosure.

The system of present disclosure allows an operator to impart metadata into the DAS system via the optical waveguides 16 and without the need to alter the DAS system. This has certain advantages. For example, an optical modulator 36 or a fiber stretcher produces a high fidelity signal, whereas the fidelity of a DAS measurement is not as high. Fiber stretchers are driven with an analog voltage and as little as a few tens of millivolts of AC signal may be sufficient to impart a signal. Thus, the acoustic sensing system of the present disclosure may use a fiber stretcher to inject signals in a controlled, high fidelity manner. Further, the system disclosed herein provides for a more efficient manner of recording operator notes and information. Moreover, the disclosed system eliminates the need to track down or synchronize information related to the drilling operation, well completion, or other oilfield activities, thus saving operator time and allowing for better data management. The system disclosed herein further provides for an efficient manner of providing security in an oil well system, as well as in other environments, including, but not limited to, pipeline monitoring, perimeter security, and the tracking of migratory animals.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. The terms in the claims have their plain, ordinary meaning unless otherwise explicitly and clearly defined by the patentee.

What is claimed is:

1. A system for recording metadata comprising:
   an acoustic vibration sensing system;
   one or more sensors operable to measure characteristic parameters, wherein the sensors are coupled to the acoustic vibration sensing system;
   one or more channels of the one or more sensors;
   a metadata associated with one or more data files, wherein the metadata is recordable on at least one of the one or more channels;
   one or more optical modulators, wherein the one or more optical modulators modulate a signal received from the one or more sensors and direct the modulated signal to the acoustic vibration sensing system; and
   one or more sources of metadata coupled to the one or more optical modulators.

2. The system of claim 1, wherein the one or more sensors are selected from a group consisting of an optical waveguide, an optical distributed acoustic sensor, an array of fiber optic Bragg grating acoustic sensors, and an optical distributed vibration sensor.

3. The system of claim 1, wherein the one or more optical modulators is selected from a group consisting of a mechanical modulator, an electrostrictive modulator, a magnetostrictive modulator, acoustostrictive modulator, an electro-optic modulator, a magneto-optic modulator, and an acousto-optic modulator.

4. The system of claim 1, wherein the one or more optical modulators is a fiber stretcher, and wherein one or more modulated optical signals are imparted onto the one or more channels.

5. The system of claim 1, wherein the metadata is selected from a group consisting of voice, flow rate data, temperature, pressure, proppant concentration, proppant type, treatment fluid concentration, treatment fluid type, revolutions-per-minute, and blender parameters.

6. A system for recording metadata comprising:
an acoustic vibration sensing system;
one or more optical waveguides coupled to the acoustic vibration sensing system;
one or more channels of the one or more optical waveguides;
a metadata associated with one or more data files, wherein the metadata is recordable on at least one of the one or more channels;
one or more optical modulators, wherein the one or more optical modulators modulates a signal received from the one or more optical waveguides and directs the modulated signal to the acoustic vibration sensing system; and
one or more sources of the metadata coupled to the one or more optical modulators.

7. The system of claim 6, wherein the metadata is selected from a group consisting of voice, flow rate data, temperature, pressure, proppant concentration, proppant type, treatment fluid concentration, treatment fluid type, revolutions-per-minute, and blender parameters.

8. The system of claim 6, wherein the one or more optical waveguides is located above ground.

9. The system of claim 6, wherein the one or more optical waveguides is located in a wellbore.

10. The system of claim 6, wherein the one or more optical waveguides is selected from a group consisting of one or more fiber optic cables and one or more fiber ribbons.

11. The system of claim 6, wherein the one or more optical modulators is selected from a group consisting of a mechanical modulator, an electrostrictive modulator, a magnetostrictive modulator, acoustostrictive modulator, an electro-optic modulator, a magneto-optic modulator, and an acousto-optic modulator.

12. The system of claim 6, wherein the one or more optical modulators is a fiber stretcher, and wherein one or more modulated optical signals are imparted onto the one or more channels.

13. The system of claim 6, wherein the one or more optical modulators is located inside a wellbore between the acoustic vibration sensing system and the well toe.

14. The system of claim 6, wherein the one or more optical modulators is located between the acoustic vibration sensing system and a wellhead.

15. The system of claim 6, wherein the acoustic vibration sensing system further comprises an information handling system and an optical device, wherein the one or more optical waveguides is coupled to the optical device, and wherein the one or more optical modulators is located between the optical device and the well toe.

16. The system of claim 15, wherein the optical device is an interrogator.

17. The system of claim 6, wherein the acoustic vibration sensing system comprises a means of regulating the metadata recorded on the one or more channels.

18. The system of claim 17, wherein the means of regulating the metadata recorded on the one or more channels comprises at least one of a means of encryption and a means of turning the microphone pickup on and off.

19. A system for recording metadata comprising:
an acoustic vibration sensing system;
one or more optical waveguides coupled to the acoustic vibration sensing system;
one or more channels of the one or more optical waveguides;
a metadata associated with one or more data files, wherein the metadata is recordable on at least one of the one or more channels;
one or more optical modulators, wherein the optical modulator modulates a signal received from the one or more optical waveguides and directs the modulated signal to the acoustic vibration sensing system; and
one or more microphone pickups coupled to the one or more optical modulators; and
one or more sources of the metadata coupled to the one or more optical modulators.

20. The system of claim 19, wherein the one or more microphone pickups is capable of recording the metadata.

* * * * *